United States Patent [19]

Crofts

[11] Patent Number: 4,467,002
[45] Date of Patent: Aug. 21, 1984

[54] DIMENSIONALLY-RECOVERABLE ARTICLE

[75] Inventor: David Crofts, Cirencester, England

[73] Assignee: Raychem Limited, England

[21] Appl. No.: 448,550

[22] Filed: Dec. 10, 1982

[30] Foreign Application Priority Data

Dec. 15, 1981 [GB] United Kingdom ................ 8137715

[51] Int. Cl.³ ........................................... H02G 15/02
[52] U.S. Cl. ............................. 428/36; 174/DIG. 8;
174/74 A; 264/230; 428/152; 428/163; 428/212
[58] Field of Search ..................... 428/7, 9, 11, 12, 36,
428/152, 163, 212, 332, 457; 174/DIG. 8, 74 A;
264/230; 204/14 R

[56] References Cited

U.S. PATENT DOCUMENTS

| | | | |
|---|---|---|---|
| 3,898,369 | 8/1975 | Clabburn | 174/DIG. 8 |
| 3,949,143 | 3/1976 | McLoughlin | |
| 4,016,356 | 4/1977 | McLoughlin | |
| 4,179,320 | 12/1979 | Midgley et al. | 428/36 |
| 4,275,180 | 6/1981 | Clarke | 428/463 |
| 4,287,012 | 9/1981 | Midgley et al. | 428/36 |
| 4,321,292 | 3/1982 | Blomgvist | 428/36 |

Primary Examiner—George F. Lesmes
Assistant Examiner—William M. Atkinson
Attorney, Agent, or Firm—James W. Peterson

[57] ABSTRACT

A dimensionally recoverable polymeric article for enclosing at least part of an elongate object such as a cable or connector has a surface at least part of which has an electrically conductive layer, preferably a metal layer, adhering thereto to provide a screen against electromagnetic interference. The surface of the article carrying the layer is profiled in the form of a number of grooves that extend substantially perpendicularly to the direction of recovery of the article to allow the article to recover with substantially no change in dimension of the surface in the direction of recovery.

18 Claims, 6 Drawing Figures

DIMENSIONALLY-RECOVERABLE ARTICLE

This invention relates to dimensionally-recoverable articles and especially to dimensionally heat-recoverable articles.

A heat recoverable article is an article the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensionally recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

In recent years such articles have become widely used for providing mechanical and environmental protection for electrical equipment such as cables and electrical harnesses. Often it is desired to provide the cable or harness with a shield to screen the wires from electrical, magnetic or electromagnetic interference or to prevent interference in neighbouring equipment caused by the cable or harness. The shield may be provided in a number of ways, for example by means of metal braids, conductive metal paints or by metal fixtures. It has been proposed to provide dimensionally-recoverable articles that are used to enclose parts of cables or harnesses with a thin coat of metal paint in order to screen the cable or harness from electromagnetic interference. However the shielding efficiency of such articles is low, usually being not more than 30 to 50 dB.

The present invention provides a dimensionally-recoverable polymeric article for enclosing at least part of an object, the article having a surface at least part of which has an electrically conductive layer adhering thereto, the surface being profiled in the form of a plurality of grooves that extend substantially perpendicularly to the direction of recovery to allow the article to recover with substantially no change in dimension of the surface in the direction of recovery.

Preferably the electrically conductive layer comprises a metal although in principle other electrically conductive materials may be used for example conductive polymer compositions e.g. polymers that contain a high loading of conductive material such as carbon, provided that the thickness of the conductive layer is sufficient to provide an effective screen. Since metals are clearly preferred for use in the present invention, it will be described below solely with reference to the use of a metal layer although it will be appreciated that other conductive materials may replace part or all of the metal in certain cases.

By forming one surface of the article with grooves extending in a direction perpendicular to the direction of recovery it is possible to provide the article with a relatively thick layer of conductive material without the metal preventing recovery of the article and without the layer cracking and flaking off the surface. Preferably the conductive layer, at least where is comprises a metal, has a thickness of at least 5 micrometers, e.g. from 5 to 50 micrometers and especially at least 10 micrometers. The preferred thickness of the conductive layer is from 10 to 30 micrometers, especially in the case of copper although when less electrically conductive metals are used e.g. lead, thicker layers may be desirable. The use of relatively thick metal layers increases the shielding performance of the article and it has been found that articles according to the invention may, in certain cases, have shielding performances of 100 dB or even higher.

Preferably the grooves are substantially chevron-shaped in cross-section and accommodate recovery of the article by changing their pitch, i.e. by becoming narrower with more steeply sloping sides. In the preferred articles the grooves lie next to each other and so are separated by lands which have essentially no width, thereby giving the metal layer a "zigzag" transverse profile. The metal layer and the underlying polymeric material can, in this case, accommodate recovery of the article by folding up in the manner of an accordian. Preferably the pitch of the grooves, i.e. the angle between the two faces of each groove, is at least 100° especially at least 130° and most especially at least 140° in the article before recovery, and, on recovery of the article, changes to a pitch in the range of from 30° to 80°, especially from 45° to 65°. In theory the article could be expanded to such an extent that the pitch of the grooves is almost 180° but it is found that when the article is expanded to this extent the faces of the grooves are stretched themselves and some degree of cracking of the metal layer is observed on recovery. Even when the article is expanded to form grooves of pitch of about 140° some expansion of the groove faces may occur but this is sufficiently small that the metal layer can prevent the grooves faces from contracting significantly on recovery of the article. Usually the grooves will have a depth in the range of from 0.4 to 2 mm although larger or smaller grooves are possible. Preferably, however, each groove has a depth at any point along its length of not more than 25% and especially not more than 10% of the diameter of the article at that point. As will be appreciated, the diameter of the article according to the invention may vary along its length and it may be necessary to vary the shape and/or size of the grooves along their length to fit the change in diameter of the article.

Because the metal layer adheres to the surface of the polymeric material and because the layer can fold during recovery of the article the layer provides little resistance to recovery of the article and folds in a controlled manner. Furthermore, correct folding of the metal is assisted by the fact that the recovery forces are exerted on the metal layer uniformly over its area and that the recovery forces are exerted on the metal layer in the circumferential direction which is parallel to the direction of the contraction of the metal layer. If the metal layer were provided as a separate foil the recovery forces would be exerted on it by recovery of the article in the radial direction on the apices of the grooves or flutes which would cause buckling of the grooves and also there would be a tendency for areas of the foil to lift off the inner surface of the article.

In most forms of article according to the invention the metal layer will itself form the inner surface of the article. It is, however, possible for one or more layers of other material such as an adhesive to be coated on the metal layer. Thus, for example, the metal layer may be coated over its entire surface or only in the region of the outlet or outlets with an adhesive such as a hot-melt adhesive or a curable adhesive, e.g. an epoxy adhesive, or with solder. Preferred adhesives are electrically conductive adhesives, e.g. silver filled epoxy adhesives for providing continuity between the metal layer and the braid or other screen of the harness or cable.

The article according to the invention may be made by forming an article having a surface at least part of which is profiled in the form of a plurality of grooves, expanding the article to render it dimensionally recoverable in a direction substantially perpendicular to the grooves and depositing a film of conductive material, preferably metal, onto the said surface.

The articles according to the invention may be formed in any desired configuration either by moulding or extrusion or by a combination of both methods as described in U.K. patent specification No. 2074931A the disclosure of which is incorporated herein by reference. The articles may for example have an open configuration and be designed so that they can be wrapped around an elongate object without access to an end of the object, the edge portions thereof having a closure arrangement to retain the edge portions together during recovery of the article as described for instance in U.S. Pat. No. 3,455,336 to Ellis. Preferably, however, the article is hollow as initially formed in which case the metal layer will be provided on the inner surface thereof as mentioned above. The articles are usually produced in the form of discrete lengths of tubing, or moulded parts such as boots, udders (a term employed herein in a general sense to cover any hollow shrinkable article comprising at least three outlets employed in the termination of electrical cables and including so-called "transitions") end-caps and the like. The grooves may be formed by giving the die-head a serrated profile for extruded articles or, for moulded articles, by machining corresponding grooves and ridges in the core pin of the mould.

Any polymeric material which can be cross-linked and to which the property of dimensional recoverability may be imparted such as those disclosed in U.K. Specification No. 990,235 may be used to form the articles. Polymers which may be used as the polymeric material include polyolefins such as polyethylene and polypropylene, and ethylene copolymers, for example with propylene, butene, hexene, octene, vinyl acetate or other vinyl esters or methyl or ethyl acrylate, polyamides, polyurethanes, polyvinyl chloride, polyvinylidine fluoride, or other fluorinated polymers or copolymers, e.g. Tefzel (trade name—commercially available from Dupont), elastomeric materials such as those disclosed in U.K. specification No. 1,010,064 and blends such as those disclosed in U.K. specification Nos. 1,284,082 and 1,294,665, and compositions such as those disclosed in our U.S. Pat. No. 4,275,180. The polymeric materials can be tailored to suit the intended use by the addition of fillers, e.g. semiconducting fillers or anti-tracking agents, flame retardants, plasticisers, pigments, stabilisers and lubricants, or where necessary, e.g. where the polymeric material is substantially con-crystalline, a hold-out agent such as a thermoplastic polymer, e.g. polyethylene, may be included in the material.

The polymeric composition may be cross-linked either by the incorporation of a chemical crosslinking agent or by exposure to high energy radiation. Examples of suitable crosslinking agents are free radical initiators such as peroxides for example, dicumyl peroxide, 2,5-bis-(t-butyl peroxy)-2,5-dimethylhexane, 2,5-bis(t-butyl-peroxy)-2,5-dimethylhexyne-3,$\alpha$,$\alpha$-bis(t-butyl-peroxy)-di-iso propylbenzene. Other examples of appropriate cross-linking agents are disclosed in C. S. Sheppard & V. R. Kamath Polymer Engineering & Science 19 No. 9 597–606, 1979 "The Selection and Use of Free Radical Initiators" the disclosure of which is incorporated herein by reference. In a typical chemically cross-linked composition there will be about 0.5 to 5 weight percent of peroxide based on the weight of the polymeric composition. The cross-linking agent may be employed alone or in association with a co-curing agent such as a polyfunctional vinyl or allyl compound, e.g. triallyl cyanurate, triallyl isocyanurate or pentaerythritol tetra methacrylate.

Radiation cross-linking may be effected by exposure to high energy irradiation such as an electron beam or gamma rays. Radiation dosages in the range 2 to 80 Mrads, preferably 2 to 50 Mrads, e.g. 2 to 20 Mrads and particularly 4 to 15 Mrads are in general appropriate.

For the purpose of promoting cross-linking during irradiation preferably from 0.2 to 5 weight percent of a prorad such as a poly-functional vinyl or allyl compound, for example, triallyl cyanurate, triallyl isocyanurate or pentaerythritol tetramethacrylate are incorporated into the composition prior to irradiation.

Preferably the profiled surface of the article will change in dimension during recovery by not more than 25% especially by not more than 10% of its original dimension in a direction parallel to the grooves. Most moulded dimensionally-recoverable articles contract in length when they are expanded radially so that they increase in length during recovery by up to 100% of their length. Too great an increase in length should be avoided in the articles according to the invention because this causes cracks in the metal layer on recovery which reduce the shielding performance in the installed article. One method by which the change in dimensions may be reduced or eliminated is by holding the article during expansion so that changes in dimensions perpendicular to the direction of expansion are eliminated or reduced. Another method which is preferably used in addition to holding the article to prevent change in dimensions is to expand the article initially to too great a size and then to recover the article after it has been expanded to an intermediate size between its initial size and its fully expanded size. Preferably the article is recovered onto a former or core especially one having a correspondingly profiled outer surface so that any distortion of the grooves or lands, other than the desired expansion, is removed.

After the article has been expanded and optionally partially recovered the metal layer is applied. The metal is preferably applied by depostion method. After an initial layer of metal has been formed, whether by electroless deposition or otherwise (e.g. by painting or spraying) the thickness may be increased by electrolytic deposition.

The preferred metals used to form the layer are copper, silver, gold, tin, lead (e.g. a tin/lead solder) aluminium, nickel or a ferrous metal and most preferably copper or silver. Laminates of different metals may be formed to improve any of the properties of the layer is desired. For example a nickel layer may be provided in contact with the polymeric material of the article in order to reduce heat ageing of the article, or a metal layer having a high magnetic permeability e.g. a layer formed from a ferrous metal, may be provided in order to increase the magnetic shielding of the article. Advantageously the metal layer is provided with a surface layer of tin especially if the metal comprises copper, in order to protect the layer from oxidation and to provide a surface suitable for use with solder. In addition it has been observed that the provision of a surface layer of tin significantly improves the high frequency screening effectiveness (e.g. above about 1 MHz) of the plated articles. It is believed that this increase in screening effectiveness is due to the fact that tin has a substantially higher elongation to break than copper and so is capable of bridging any small cracks that may occur in the copper layer whether due to rough handling of the article or whether because the article changes somewhat in dimensions parallel to the grooves during recovery. The improvement in screening effectiveness of this plated copper as compared with unplated copper is most significant at high frequencies (above 1 MHz) partly because it is at these frequencies that the wavelength of the electromagnetic radiation is of the same order of magnitude as the size of the cracks in the copper layer, thereby reducing the screening effectiveness of the unplated copper. Also, because at these high frequencies electric current is carried through the tin layer due to the so-called "skin effect" the presence of cracks in the copper layer will not adversely affect the conductivity of the tin plated copper screen to a significant extent.

In the preferred process the surface to be coated of the expanded (and optionally partially recovered) article is etched in order to ensure a good bond between the polymeric material and the metal. Suitable methods of etching include chromic acid etching, refluxing with hydrocarbon vapour e.g. 1,1,1-trichloroethane or tetrachloromethane, plasma etching or etching with hydrogen fluoride vapour. The preferred method is to treat the article for one minute at 50° C. with an etching liquid comprising chromium (VI) oxide, orthophosphoric acid, sulphuric acid and water. The metal may then be deposited on the surface by the following procedure:

(a) Activation of the surface

The etched surface is treated with a weakly acidic solution of stannous ions, for example 10 to 30 g. liter$^{-1}$ of tin (II) chloride and 60 g. liter$^{-1}$ hydro-chloric acid at 20° C. for ¼ to 6 minutes. On rinsing the tin chloride is hydrolysed to tin (II) hydroxide.

(b) Sensitization

The activated surface is then treated with a noble metal chloride solution e.g. a weakly acidic palladium, platinum or gold chloride solution, preferably palladium chloride, at 20° C. for from ¼ to 6 minutes during which the noble metal is precipitated on the surface as exemplified by the reaction:

$$Sn(OH)_2 + PdCl_2 \rightarrow Sn(OH)_2Cl_2 + Pd$$

(c) Electroless deposition

The surface is then treated with a plating solution containing a salt of the metal to be plated. As an example, a typical solution for depositing copper comprises:
Copper Sulphate: 10–50 g/l
Rochelle salt: 10–50 g/l
Sodium Hydroxide: 5–20 g/l
Formaldehyde: 10–100 g/l In this process copper is deposited on the surface by the reaction:

$$Cu^{++}(complexed) + HCHO + 3OH^- \rightarrow Cu + HCO^-_2 + 2H_2O$$

and the reaction is catalysed by hydrogen evolved in the reaction:

$$HCHO + OH^- \rightarrow HCO^-_2 + H_2$$

The surface may be treated with the electroless plating solution for a period of from 5 to 30 minutes to produce a metal layer of thickness in the region of 0.5 to 1.0 micrometers, in which case the thickness of the layer is then increased by conventional electroplating techniques. However, because of the intricate shape of the surface it is preferred to build up the layer by the electroless process only in which case step (c) is continued for a period of several hours. In the case of a copper layer a thin layer of tin may subsequently be deposited electrolytically on the surface.

Several articles in accordance with the invention will now be described by way of example with reference to the accompanying drawings in which.

Figure 1:
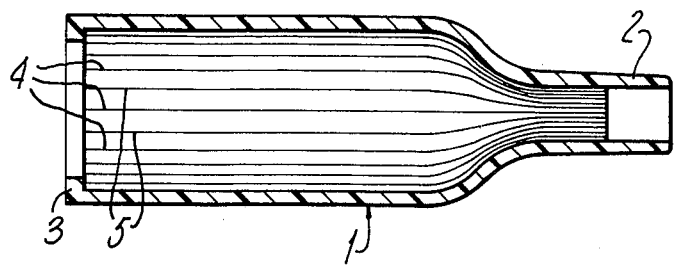
FIGS. 1 to 4 are longitudinal sections through four different moulded articles according to the invention after recovery.

Referring to FIG. 1 of the accompanying drawings, a straight moulded article or boot according to the invention comprises a body 1 having a narrow end 2 of tapering thickness intended to be located over the wires of a harness and wide end 3 intenfded to be located over an electrical connector. As shown, the boot is in its fully recovered configuration. The internal surface of the boot which has a metal layer thereon, has been provided along substantially its entire length with a number of chevron-shaped grooves 4 that are separated by ridge-shaped lands 5 to give the surface a fluted configuration.

The article is formed by moulding the part in this configuration and cross-linking the polymeric material in the mould by chemical cross-linking agents. The internal surface of the article has a diameter of about 2.5 cm at the end 3 and is provided with about fifty grooves each having a width of about 1.5 mm, a pitch of 60° and a height of 1.3 mm. At the narrow end 2 which has the same number of grooves the grooves are correspondingly smaller but have substantially the same pitch. A pitch of 60° allows the article to be expanded radially to about 1.75 times its initial dimensions without increasing the internal surface area.

After moulding, the article is expanded radially to about twice its initial dimensions by sliding it when hot over a polytetrafluroethylene mandrel and quenching it in its expanded state, the expansion being performed while holding the ends 2 and 3 at their correct distance apart in order to prevent any longitudinal change on subsequent recovery. After expansion the article is recovered onto a core having a size corresponding to about 1.75 the initial internal dimensions of the article and having a profiled outer surface corresponding to the internal surface of the article taking into account the change in pitch of the grooves of the article. After recovery of the article it is removed from the core and the internal surface of the article is etched and plated with copper by the electroless process described above to a thickness of about 25 micrometers. A thin layer of tin is electrolytically deposited on the copper to prevent oxidation of the copper surface. The article is then ready for use and may be recovered about a connector in a wiring harness.

Figure 2:
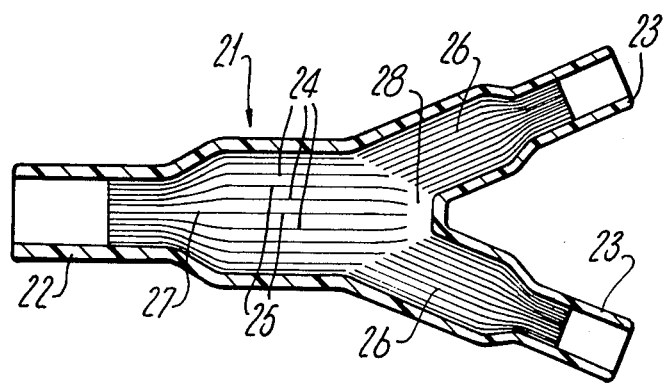

FIG. 2 is a sectional elevation through a three-outlet moulded article or transition according to the invention after recovery. The article comprises a a body 21 having a main outlet 22 and two branch outlets 23. The internal surface of the body is provided with chevron-shaped grooves 24 separated by ridge-shaped lands 25 extending substantially the entire length of the body and outlet 22, the grooves contracting in width and depth in a region 27 corresponding to the shoulder of the article. The two outlets 23 are also provided with grooves 26 extending along the outlets 23. Some of the grooves 26 will extend in a direction perpendicular to that of the grooves 24 in view of the different direction of expansion and recovery of different parts of the article.

As can be seen, the grooves do not extend along the entire length of the article. One end region 28 of the body 1 between the outlets 23 is not provided with grooves because this part of the internal surface will not be expanded when the rest of the article is expanded. The ends of the outlets 22 and 23 are also not provided with grooves (although this would still be possible) because the ends of the outlets are intended to be coated with an epoxy adhesive to bond the outlets to the jacket of the underlying cable. After moulding the article is expanded and plated with a metal screen as described above with reference to FIG. 1.

Figure 3:
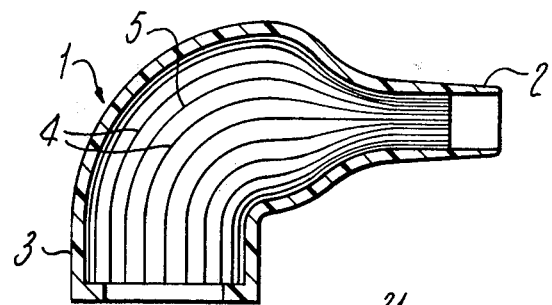

FIG. 3, in which the same reference numerals are used as in FIG. 1, shows an article similar to that shown in FIG. 1 but intended for enclosing a 90° connection between a cable and a connector.

Figure 4:
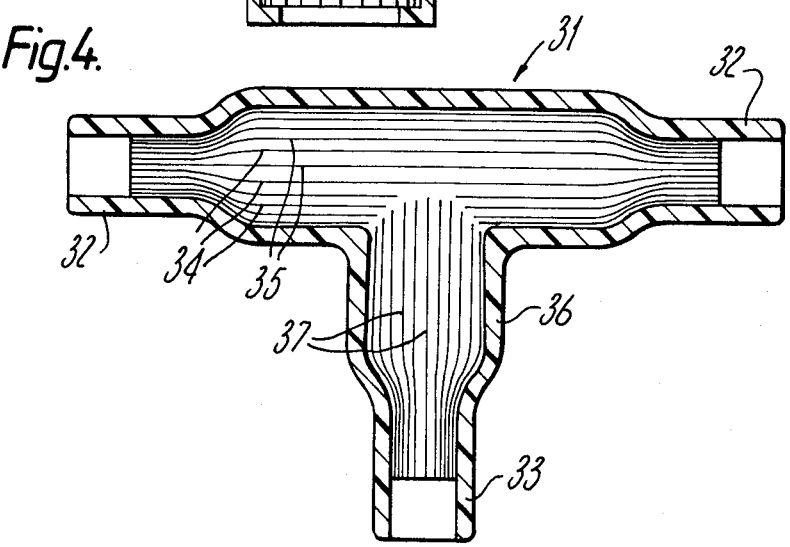

FIG. 4 shows a three outlet moulded part for enclosing a "T" junction in a cable or harness. The part, shown in its fully recovered configuration, comprises a body 31 having two main outlets 32, one at each end, and a side outlet 33 that is connected to the body 1 by an arm 36. The internal surface of the body 1 is provided with grooves 34 separated by ridge shaped lands 35 as in the previous figures, and the arm 36 connecting the body 1 to the side outlet 33 is provided with another series of grooves 37. The article is formed by moulding and crosslinking followed by expansion and plating as described with reference to FIG. 1 to provide it with a tin plated copper screen.

In many cases it is not necessary for the metal layer to have a thickness as great as 25 micrometers and a layer thickness of about 15 micrometers has been found to be a good compromise between screening effectiveness and manufacturing cost. Currently the preferred layer comprises a 0.5 micrometer layer of nickel deposited on the polymeric surface followed by a 12 micrometer layer of copper and finally a 2.5 micrometer layer of tin.

Figure 5:
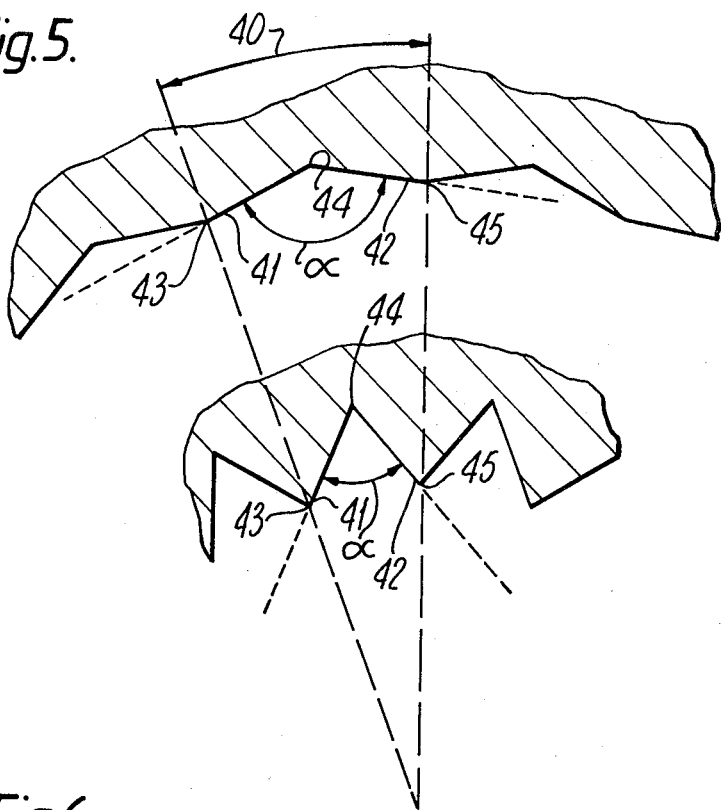
FIG. 5 is a schematic transverse section through part of an article before and after recovery.

FIG. 5 shows schematic sections through part of an article according to the invention perpendicular to the direction of the grooves. A groove 40 defined by lands 43 and 45 has two faces 41 and 42 which meet at the apex 44 of the groove. In the expanded state, the pitch of the groove is about 130° and the expansion ratio is about 1.75. On recovery the pitch alpha decreases to about 60° while the area of the coated surface, given by the sum of the surface areas of the faces 31 and 32, does not change substantially.

The following Examples illustrate the invention:

EXAMPLE 1

Three 202K153-3 heat-shrinkable parts modified by the provision of grooves substantially as shown in FIG. 1 having an internal diameter of 18 mm at the H (wide) end and 7.5 mm at the J (narrow) outlet and provided on their internal surface with 36 grooves of 60° pitch in the body and 45° in the J outlet were expanded so that the H end internal diameter was 36 mm and the J outlet internal diameter was 22 mm. The parts were etched in a bath of chromic acid sold by IMASA Ltd Slough England under the trade name "Enplate Conditioner 473", sensitised using "Enplate Activator 443" and PA491 (trade names) and plated using Enplate 2-525 (trade name) electroless copper plating solution. The parts were plated to a thickness of 10, 20 and 30 micrometers.

The samples according to the invention were evaluated to determine their screening performance after recovery to their initial size, the results being given in terms of attenuation as calculated from the measured value of surface transfer impedance using the equation:

$$\text{Attenuation (dB)} = 20 \log (Z_o/Z_t)$$

Where $Z_o$ is the impedance of free space (377 ohms) and $Z_t$ is the surface transfer impedance.

The surface transfer impedance was determined generally in accordance with the international specification IEC 96 and British Standard 2316 and as described in the Brochure entitled "Optimised and Superscreened Cables" available from Raychem Ltd., Wire and Cable Division, Farday Rd., Dorcan, Swindon, Wiltshire, England.

The screening performance was compared with the following conventional boots:

(A) RFI silver paint coated heat-shrinkable boot sold by Chomerics, Woburn 5 Mass. U.S.A. under designation 202D153-3.

(B) RFI silver paint coated heat-shrinkable boot sold by Raychem under designation 202K153-3.

(C) Screened braided adaptor 204M020-19-0312 with a 202K153-3 boot supplied by Raychem.

The results are shown in tables I and II.

TABLE I

| SAMPLE | Layer thickness | Measured surface transfer impedance (in m ohms) Frequency | | | | |
|---|---|---|---|---|---|---|
| | | 40 kHz | 100 kHz | 500 kHz | 1 MHz | 30 MHz |
| 1 | 10 | 1.5 | 1.5 | 1.5 | 1.3 | 0.9 |
| 2 | 20 | 0.8 | 0.8 | 0.7 | 0.6 | 0.3 |
| 3 | 30 | 0.7 | 0.7 | 0.6 | 0.4 | 0.3 |
| Comparative | | | | | | |
| A | | 800 | 800 | 800 | 800 | 800 |
| B | | 550 | 550 | 550 | 575 | 600 |
| C | | 4 | 2 | 3 | 5 | 63 |

TABLE II

| Sample | Layer thickness | Attenuation (dB) Frequency | | | | |
|---|---|---|---|---|---|---|
| | | 40 kHz | 100 kHz | 500 kHz | 1 MHz | 30 MHz |
| 1 | 10 | 108 | 108 | 108 | 109 | 112 |
| 2 | 20 | 113 | 113 | 115 | 116 | 122 |
| 3 | 30 | 115 | 115 | 116 | 119 | 122 |
| Comparative | | | | | | |
| A | | 53 | 53 | 53 | 53 | 53 |
| B | | 57 | 57 | 57 | 56 | 56 |
| C | | 99 | 105 | 102 | 98 | 76 |

EXAMPLE 2

A202K153-3 heat shrinkable part was modified by the provision of grooves and was plated with metal as described in Example 1 with the exception that:

(a) A 0.5 micrometer nickel layer was initially deposited by replacing the Enplate 2-525 copper plating solution with an Enplate (trade name) Nickel 414 solution, (b) The copper layer was electrolytically deposited onto the nickel layer to a thickness of 12 micrometers; and (c) A 2.5 micrometer thick layer of tin was deposited onto the copper layer using a "silver crown" (trade name) bright acid tin solution available from IMASA Ltd, Slough, England.

Figure 6:
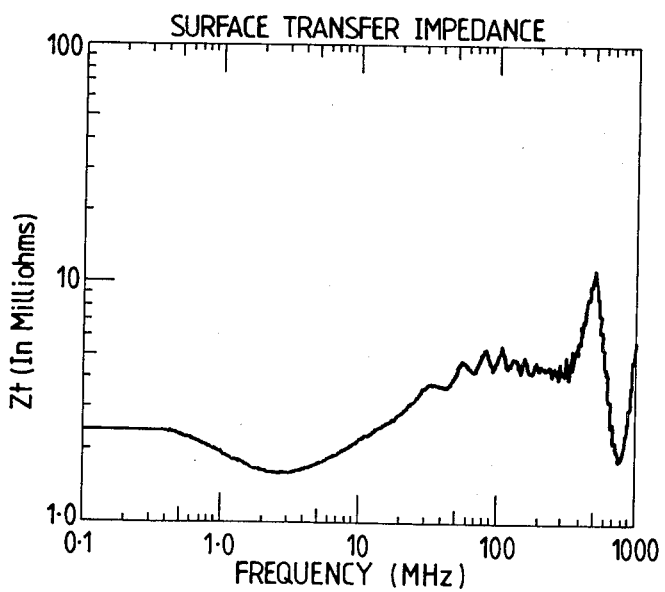
FIG. 6 is a graphical representation of the surface transfer impedance of an article according to the invention after recovery.

The surface transfer impedance of the part after recovery onto a double optimised braided cable and fixed adaptor was measured as described above and the values for the transfer impedance in the frequency range of 100 kHz to 1 GHz are shown graphically in FIG. 6.

I claim:

1. A dimensionally recoverable polymeric article for enclosing at least part of an object, the article having one surface at least part of which has an electrically conductive layer adhering thereto, said one surface being profiled in the form of a plurality of grooves that are substantially chevron-shaped in cross-section and that extend substantially perpendicularly to the direction of recovery to allow the article to recover with substantially no change in dimension of the surface in the direction of recovery, said grooves accommodating recovery of the article by changing pitch.

2. An article as claimed in claim 1, wherein at least some of the grooves have a pitch of at least 100° over at least part of their length.

3. An article as claimed in claim 2, wherein at least some of the grooves have a pitch of at least 130° over at least part of their length.

4. An article as claimed in claim 1, wherein the conductive layer has a thickness in the range of from 5 to 50 micrometers.

5. An article as claimed in claim 4 wherein the electrically conductive layer comprises a metal.

6. An article as claimed in claim 1 wherein the electrically conductive layer comprises a metal.

7. An article as claimed in claim 6, wherein the metal is selected from the group consisting of copper, silver, gold, tin, aluminium, nickel and ferrous metals.

8. An article as claimed in claim 7, wherein the metal is copper.

9. An article as claimed in claim 1, wherein the electrically conductive layer comprises tin-plated copper.

10. An article as claimed in claim 1, wherein the electrically conductive layer includes a nickel layer in contact with the polymeric material of the article.

11. An article as claimed in claim 1, wherein said article has a hollow form having said one surface as the inner surface thereof.

12. An article as claimed in claim 1, which comprises a cross-linked polymeric material.

13. An article as claimed in claim 1, which is dimensionally heat-recoverable.

14. A process for the production of a dimensionally recoverable article which comprises the steps of:

(a) forming an article having a surface at least part of which is profiled in the form of a plurality of grooves that are substantially chevron-shaped in cross-section, (b) expanding the article to render it dimensionally recoverable in a direction substantially perpendicular to the grooves and, (c) depositing a layer of an electrically conductive material onto the said surface.

15. A process as claimed in claim 14 wherein the electrically conductive material comprises a metal and step (c) comprises electroless deposition.

16. A process as claimed in claim 15, wherein step (c) further comprises subsequent electroplating.

17. A process as claimed in claim 14, wherein between step (b) and step (c) the article is allowed to recover from the size to which it was expanded in step (b) to a size that is greater than the size to which it was formed in step (a).

18. A process as claimed in claim 14, wherein during expansion of the article in step (b) the article is constrained from changing its dimensions in a direction perpendicular to the direction of expansion.

* * * * *

UNITED STATES PATENT AND TRADEMARK OFFICE
CERTIFICATE OF CORRECTION

PATENT NO. : 4,467,002
DATED     : August 21, 1984
INVENTOR(S) : DAVID CROFTS

It is certified that error appears in the above-identified patent and that said Letters Patent are hereby corrected as shown below:

Col. 2, line 60, delete "grooves" and insert --groove--.
Col. 4, line 24, delete "(t-butyl " and insert --($\underline{t}$-butyl --, and delete "t" (last character of line) and insert --$\underline{t}$--.
Col. 4, line 25, delete "(t-butyl-" and insert --($\underline{t}$-butyl---.
Col. 6, line 24, after "+3" delete numeral "0" and insert letter --O--, and on line 24, after " ->Cu+" delete "H-" and insert --HCO$^-_2$--.
Col. 6, line 25, delete "CO$^-_2$".

Signed and Sealed this

Third Day of September 1985

[SEAL]

Attest:

DONALD J. QUIGG

Attesting Officer     Acting Commissioner of Patents and Trademarks - Designate